United States Patent [19]
Osawa

[11] Patent Number: 5,482,377
[45] Date of Patent: Jan. 9, 1996

[54] RAIL-CONNECTING JIG FOR LINEAR GUIDE

[75] Inventor: Nobuyuki Osawa, Gunma, Japan

[73] Assignee: NSK Ltd., Tokyo, Japan

[21] Appl. No.: 321,832

[22] Filed: Oct. 6, 1994

[30] Foreign Application Priority Data

Oct. 7, 1993 [JP] Japan ................ 5-054556 U

[51] Int. Cl.$^6$ ............................................. F16C 29/06
[52] U.S. Cl. ................................ 384/45; 29/281.5
[58] Field of Search ...................... 384/45, 44, 43; 29/281.5; 464/168

[56] References Cited

U.S. PATENT DOCUMENTS

| | | | |
|---|---|---|---|
| 4,505,463 | 3/1985 | Hirai | 269/56 |
| 4,612,946 | 9/1986 | Noh et al. | 134/62 |
| 5,104,162 | 4/1992 | Watanabe | 29/274 |
| 5,105,516 | 4/1992 | Enomoto et al. | 29/281.5 |

*Primary Examiner*—Lenard A. Footland
*Attorney, Agent, or Firm*—Sughrue, Mion, Zinn, Macpeak & Seas

[57] ABSTRACT

A rail-connecting jig for a linear guide provides: a jig body substantially U-shaped in section which is loosely mounted over guide rails, the jig body including a pair of right and left wings the inner side surfaces of which when the jig body is mounted on the guide rails, are confronted with two side surfaces of each guide rail in which rolling-element rolling grooves are formed; and at least two bar-shaped rollers which are engageable with the rolling-element rolling grooves of each guide rail. One of the two bar-shaped rollers is held on the inner side surface of one of the wings, while the other bar-shaped roller is arranged in the other wing of the jig body. A roller-pushing member is provided to move the other roller into and out of engagement with the guide rails. That is, a pair of guide rails can be aligned with each other by fitting the bar-shaped rollers in the rolling-element rolling grooves at the junction of the two guider rails. Thus, without use of an expensive measuring instrument, the guide rails can be accurately and efficiently connected to one another.

13 Claims, 4 Drawing Sheets

RAIL-CONNECTING JIG FOR LINEAR GUIDE

BACKGROUND OF THE INVENTION

The present invention relates to a rail-connecting jig for a linear guide, and more particularly to an improvement of an operation of connecting guide rails in a linear guide of long stroke type which is employed, for instance, in a conveying device in an automatic warehouse.

Conventionally, an operation of connecting a plurality of guide rails having a predetermined length to one another to form a long guide rail assembly is carried out as follows: As shown in FIG. 5, guide rails 1 are laid with their ends abutted against each other. A straight edge 2 equipped, for instance, with a dial gauge 3 is disposed in parallel with the guide rails 1 thus laid. Under this condition, while the dial gauge 3 is moved back and forth to alternately measure the positions of the guide rails 1 on both sides of a connecting portion 4, the guide rails 1 are fixed with bolts inserted into rail fixing bolt holes 5.

The above-described conventional guide-rail-connecting operation in which, while the positions of the guide rails laid with the ends abutted against each other are precisely measured with the dial gauge, the guide rails are connected to each other with high accuracy, can be achieved relatively smoothly, for instance, in connecting guide rails on a machine of precision type such as a machine tool.

However, the conventional rail-guide-connecting operation is not applicable to general industrial machines such as those in an automatic warehouse because the industrial machines have no precise reference surface; that is, because it is difficult to use a straight edge or the like. Hence, there has been a strong demand for provision of a rail-connecting jig for a linear guide with which the guide rails can be accurately and efficiently connected to one another without use of a straight edge and a dial gauge.

SUMMARY OF THE INVENTION

Accordingly, an object of the present invention is to provide a guide-connecting jig for a linear guide with which guide rails can be accurately and efficiently connected to one another without a special instrument such as a straight edge and a dial gauge.

The foregoing object and other objects of the present invention have been achieved by the provision of a rail-connecting jig for connecting the guide rails including rolling-element rolling grooves in a linear guide, which, according to the present invention, provides: a jig body substantially U-shaped in section which is loosely mounted over the guide rails, the jig body including first and second wings on inner side surfaces thereof which are confronted with the respective rolling-element rolling grooves of the guide rails; first and second bar-shaped rollers engaging with the respective rolling-element rolling grooves of the guide rails, the first roller being held on an inner side surface of the first wing, and the second roller being arranged in the second wing of the jig body so as to being confronted with the first roller through the guide rails; and a roller-pushing member for moving the second roller in and out of engagement with the guide rails.

In a linear guide, rolling-element rolling grooves are formed in both side surfaces of each of the guide rail with high accuracy. Therefore, two guide rails can be aligned with each other by fitting the bar-shaped rollers in the rolling-element rolling grooves at the junction of the two guider rails. The guide rails aligned with each other in this manner are fixedly secured with bolts. Thus, the guide rails can be accurately and efficiently connected to one another without use of an expensive measuring instrument.

DETAILED DESCRIPTION OF THE PREFERRED EMBODIMENTS

Figure 1:
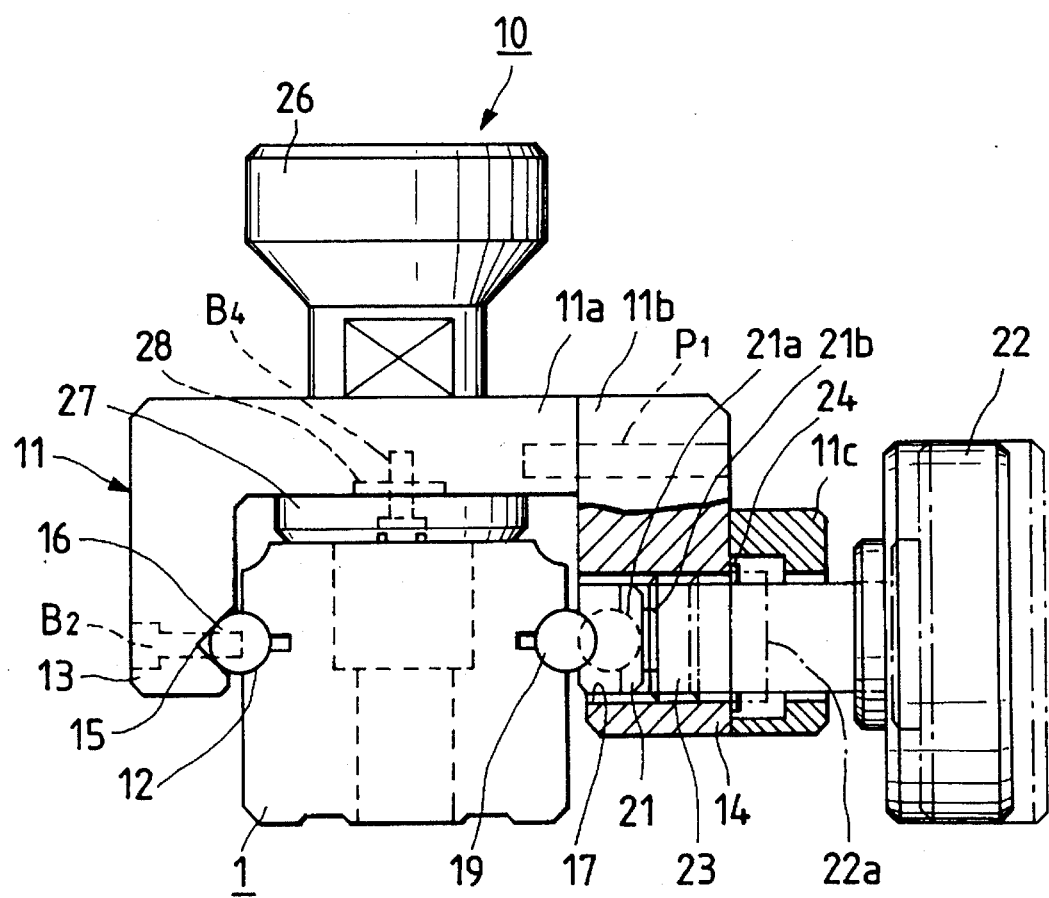
FIGS. 1, 2 and 3 are a front view, a plan view, and a side view, respectively, showing a rail-connecting jig for a linear guide, which constitutes one embodiment of the present invention.

A rail-connecting jig for a linear guide, which constitutes one embodiment of the present invention, will be described with reference to FIGS. 1 through 4.

As shown in those figures, a jig body 11 is substantially U-shaped in section having right and left wings 14 and 13, and it is laid over guide rails 1 having rolling-element rolling grooves 12. More specifically, the jig body 11 is made up of a body member 11a L-shaped in section and a body member 11b rectangular in section. The body member 11b is accurately positioned on the end face of the body member 11a by parallel pins P1 and P2, and then fixed with bolts B1.

When the jig body 11 thus formed is laid over the guide rails 1, the right and left wings 14 and 13 of the jig body 11 are slightly spaced from the side surfaces of each of the guide rails 1. A positioning V-groove 15 is formed in the inner surface of the left wing 13. The V-groove 15 is extended axially and confronted with the rolling-element rolling groove 12 in each of the guide rails 1. A bar-shaped roller 16 having threaded holes is fitted in the V-groove 15, and bolts B2 are inserted into the left wing 13 from outside and engaged with the threaded holes of the roller 16 to fixedly secure the roller 16. Thus, the roller 16 is a stationary roller.

Figure 2:
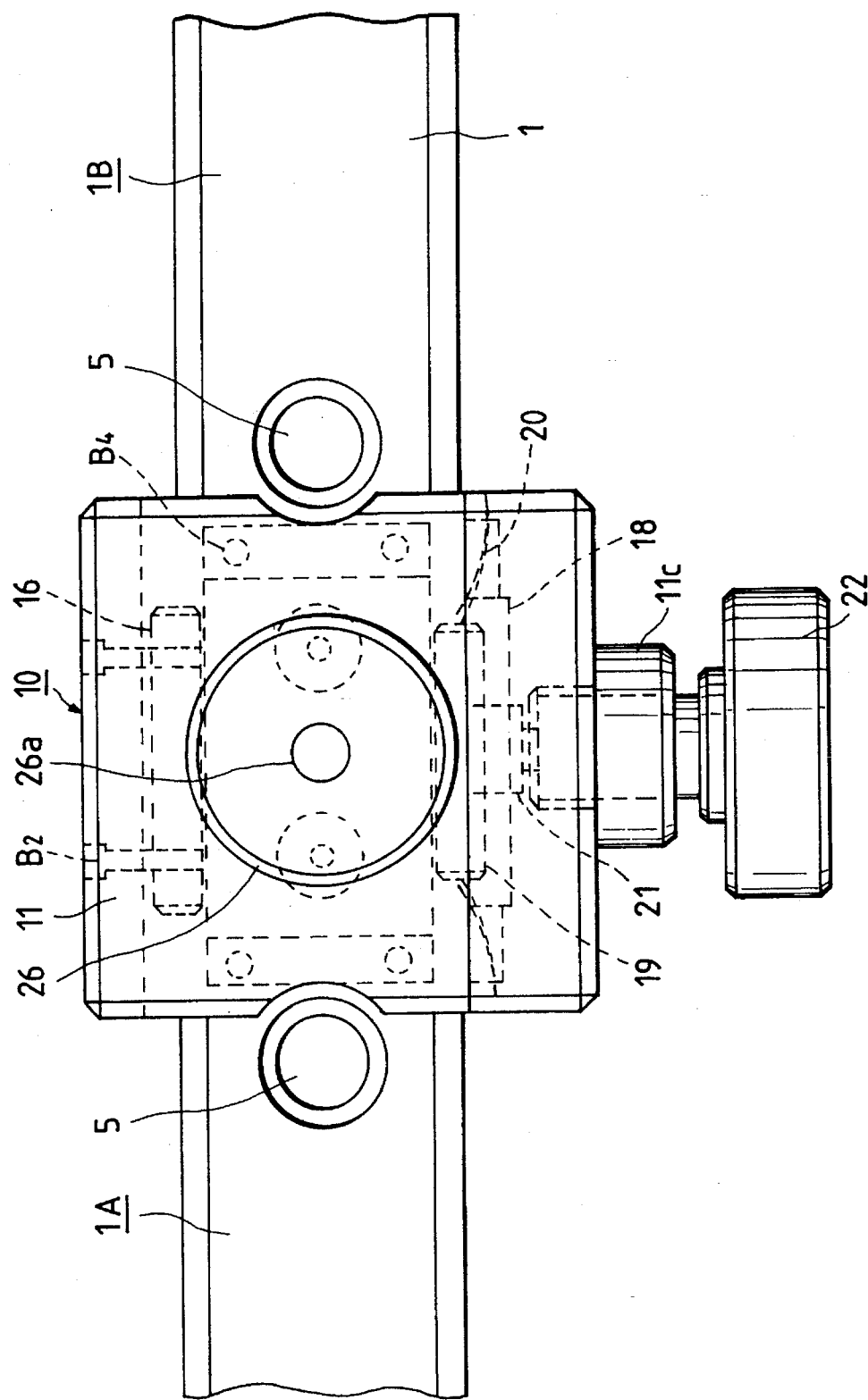
Figure 3:
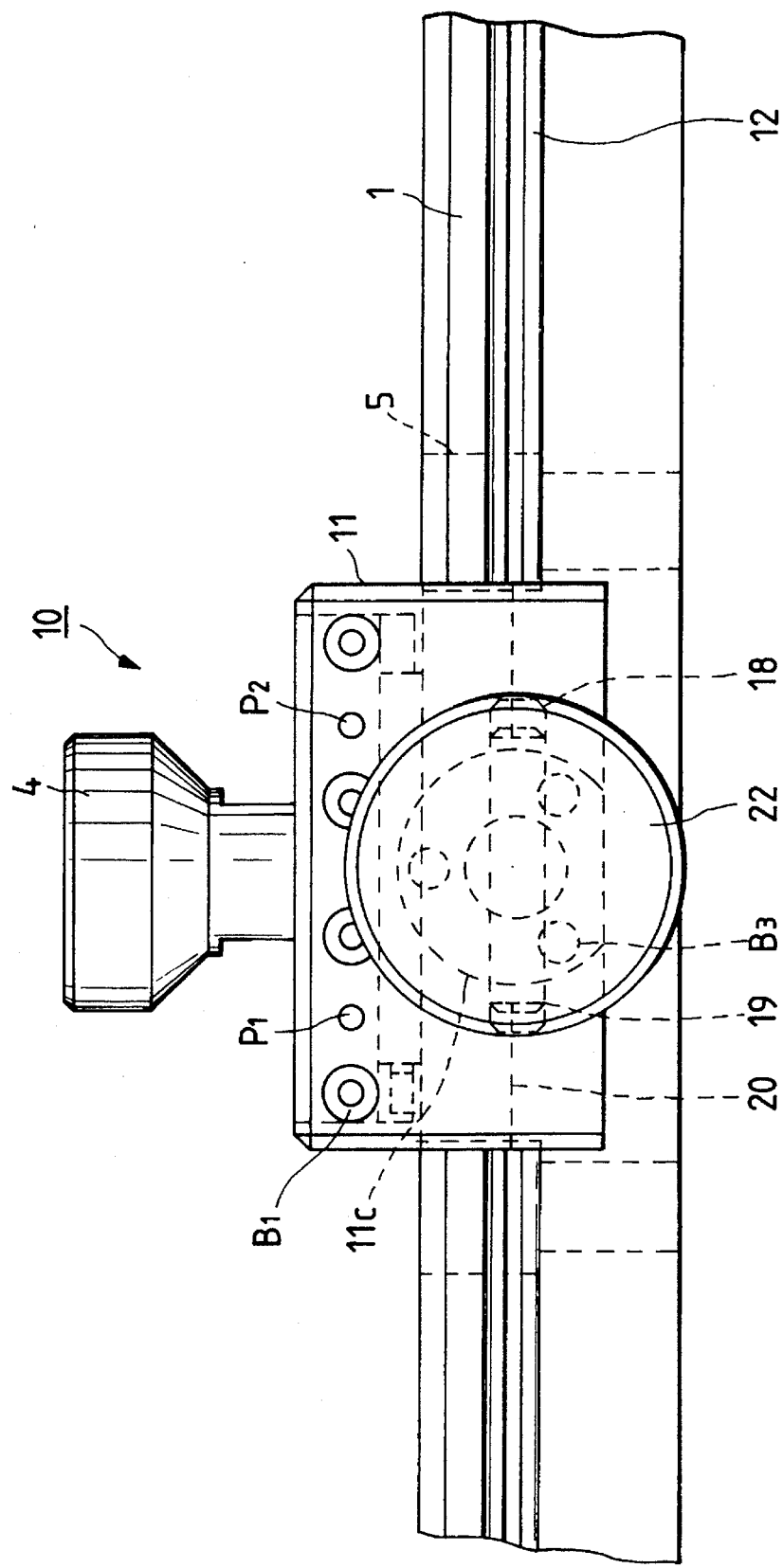

On the other hand, a through-hole 17 is formed in the right wing 14 of the jig body 11 in such a manner that a center of the through-hole 17 is aligned with a position confronted with the rolling-element rolling groove 12 of each of the guide rails 1, thus the through-hole 17 being perpendicular to the rolling-element rolling groove 12. In the embodiment, the inner surface of the through-hole 17 is female-threaded; that is, the through-hole 17 is a female-threaded hole. As shown in FIGS. 2 and 3, a long groove 18 is formed in the inner surface of the right wing 14 in such a manner that it is extended axially and has the through-hole 17 at the middle of the long groove 18, thus being perpendicular to the through-hole 17. The dimensions (width, length and depth) of the long groove 18 are so determined that they are large enough for the long groove 18 to accommodate another bar-shaped roller 19. The roller 19 is fitted in the long groove 18. The roller 19 is moved in and out of the long groove 18 when the rail-connecting jig 10 is operated as described later. For this purpose, both ends of the roller 19 are supported through two spring steel wires 20 on the right wing 15 so that the roller 19 is movable back and forth.

A roller-pushing member 23 providing a roller-pushing piece 21 and a clamp handle 22, is provided back of the bar-shaped roller 19 accommodated in the long groove 18.

The roller-pushing piece 21 is formed of a disk which is slightly smaller in diameter than the thread diameter of the through-hole 17. More specifically, the roller-pushing piece 21 has a roller groove 21a in the front surface, and a small protrusion 21b on the rear surface. The roller-pushing piece 21 is accommodated in the through-hole 17 in such a manner that it is movable back and forth. On the other hand, the clamp handle 22 has a male-threaded portion 22a, which is engaged with the female-threaded through-hole 17 with its front end face abutted against the small protrusion 21b of the roller-pushing piece 21. A cylindrical body member 11c is fixedly mounted on the outer surface of the right wing 14 of the guide rail 1 with bolts B3. A C-shaped retaining ring 14 mounted on the barrel of the clamp handle 22 is engaged with the cylindrical body member 11 thus mounted so that the clamp handle 22 may not come off.

A grip 26 having a rail-connection-confirming hole 26a is fixedly mounted on the outer surface of the jig body 11 which is perpendicular to the right and left wings 14 and 13 of the jig body 11. On the other hand, in order to protect the upper surface of the guide rail 1 from scratch or damage, a plastic slide board 27 is fixedly mounted on the inner surface of the jig body 11 which is perpendicular to the right and left wings 14 and 13, by using bolts B4 inserted into O-rings 28.

Next, the function of the rail-connecting jig 10 will be described.

It is assumed that guide rails 1A and 1B are connected to each other with the end faces abutted against each other.

At first, the clamp handle 22 of the rail-connecting jig 10 is held at the retracted position, and therefore the movable bar-shaped roller 19 is held accommodated inside the right wing 14. The rail-connecting jig 10 is laid over the connecting end faces of the guide rails 1A and 1B. In this operation, the slide board 27 is brought into contact with the upper surfaces of the guide rails 1A and 1B, while the stationary bar-shaped roller 16 and the movable bar-shaped roller 19 are confronted with the rolling-element rolling grooves in both side surfaces of each of the guide rails 1A and 1B, respectively.

Figure 4:
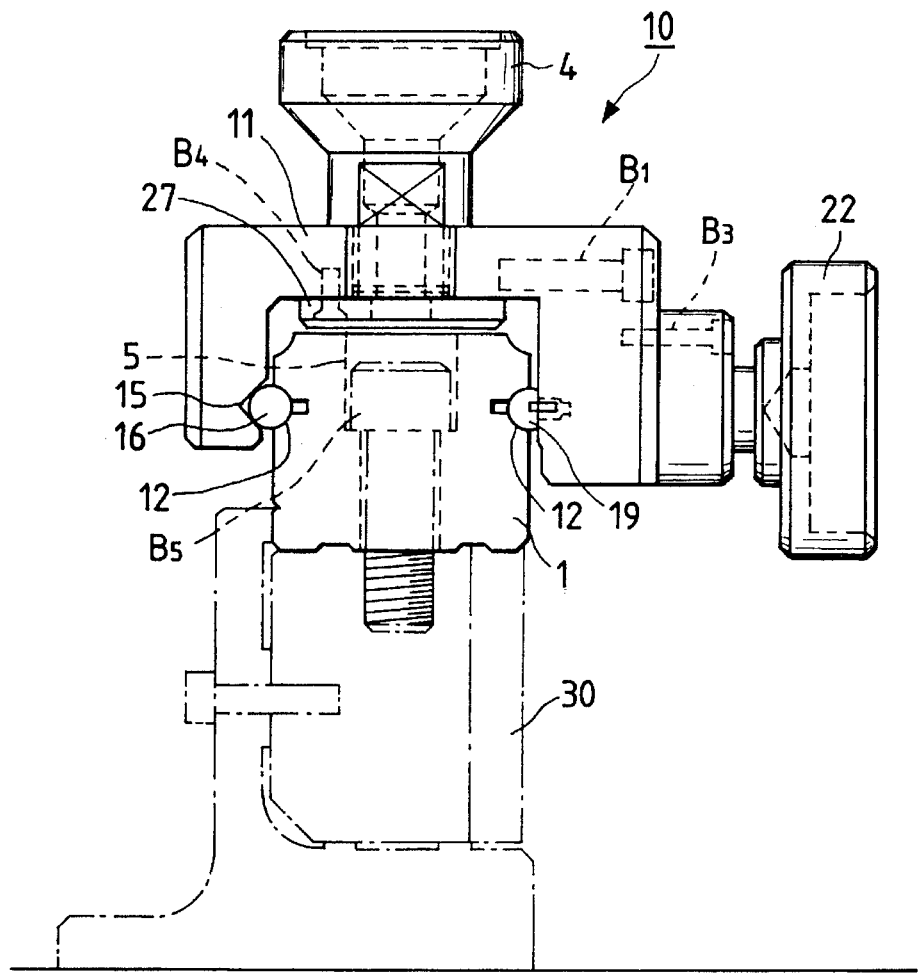
FIG. 4 is a front view for a description of the function of the rail-connecting jig.
Figure 5:
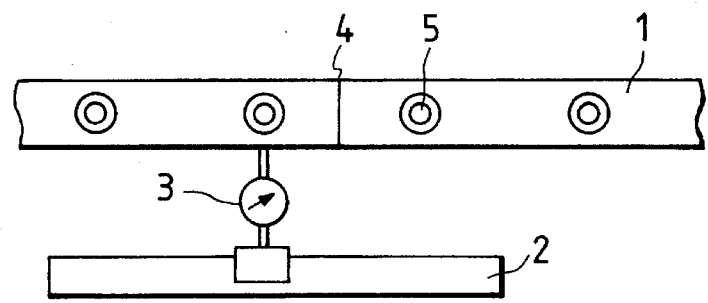
FIG. 5 is a plan view for a description of a rail-connecting operation for a conventional linear guide.

Under this condition, with the grip 26 held with one hand, the stationary bar-shaped roller 16 is shifted towards the rolling-element rolling groove 12 of each of the guide rails, while the clamp handle 22 is tightened by turning it clockwise. As a result, the roller-pushing piece 21 and the movable bar-shaped roller 19 are moved forwardly against the elastic force of the wires 20. Thus, as shown in FIG. 4, the bar-shaped rollers 16 and 19 are fixedly engaged with the right and left rolling-element rolling grooves 12, respectively. As is apparent from the above description, the guide rails 1A and 1B are aligned with each other with ease and with high accuracy merely by bringing the bar-shaped rollers 16 and 19 into close contact with the rolling-element rolling grooves 12. Under this condition, bolts Ba are inserted into mounting bolt holes 5 formed in the guide rails and engaged with threaded holes formed in the rack 30. Thus, the guide rails 1A and 1B have been fixedly mounted on the rack 30.

Thereafter, the clamp handle 22 of the rail-connecting jig 10 is loosened to remove the rail-connecting jig 10 from the guide rails. That is, when the clamp handle 22 is loosened, the movable bar-shaped roller 19 is set inside the right wing 14 again being automatically retracted by the elastic force of the wires 20. Thus, the rail-connecting jig 10 can be readily removed from the guide rails.

The embodiment has been described with reference to the case where each of the guide rails has only one rolling-element rolling groove in each of its two side surfaces. However, the technical concept of the present invention is applicable to the case where each of the guide rails has more than one rolling-element rolling groove in each of its two side surfaces.

As described above, the rail-connecting jig of the present invention, provides: the jig body substantially U-shaped in section which is loosely mounted over guide rails, the jig body including the right and left wings the inner side surfaces of which, when the jig body is mounted on each guide rail, are confronted with two side surfaces of the guide rail in which rolling-element rolling grooves are formed; at least two bar-shaped rollers which are engageable with the rolling-element rolling grooves of each guide rail, one of the two bar-shaped rollers being held on the inner side surface of one of the wings so as to be engaged with the rolling-element rolling groove formed in one of the two side surfaces of each guide rail, the other bar-shaped roller being arranged in the other wing of the jig body so as to be engaged with the rolling-element rolling groove formed in the other side surface of each guide rail; and a roller-pushing member for moving the other roller into and out of engagement with each guide rail. Hence, two guide rails can be aligned with each other by fitting the bar-shaped rollers in the rolling-element rolling grooves at the junction of the two guider rails. Thus, the guide rails can be accurately and efficiently connected to one another without use of an expensive measuring instrument.

What is claimed is:

1. A rail-connecting jig for connecting guide rails including rolling-element rolling grooves in a linear guide, comprising:

a jig body substantially U-shaped in section which is loosely mounted over the guide rails, the jig body including first and second wings on inner side surfaces thereof which are confronted with the respective rolling-element rolling grooves of the guide rails;

first and second bar-shaped rollers engaging with the respective rolling-element rolling grooves of the guide rails, the first roller being held on an inner side surface of the first wing, and the second roller being arranged in the second wing of the jig body so as to being confronted with the first roller; and a roller-pushing means for moving the second roller in and out of engagement with the guide rails.

2. The rail-connecting jig of claim 1, wherein the jig body is made up of a first body member L-shaped in section and a second body member rectangular in section, the second body member being positioned on an end face of the first body member by parallel pins.

3. The rail-connecting jig of claim 1, wherein the first wing includes a positioning V-groove formed in the inner side surface thereof and extended axially along the guide rails.

4. The rail-connecting jig of claim 3, wherein the first roller includes threaded holes and is fitted in the V-groove, and bolts are inserted into the first wing from an outside of the jig body and engaged with the threaded holes to fixedly secure the first roller.

5. The rail-connecting jig of claim 1, wherein the second wing includes a through-hole formed in the second wing so that the through-hole is perpendicular to the rolling-element rolling grooves.

6. The rail-connecting jig of claim 5, wherein the second wing includes a long groove formed in an inner side surface thereof and extended axially along the guide rails so that the through-hole is disposed at a middle of the long groove perpendicular to the through-hole, and the long groove having dimensions enough to accommodate the second roller.

7. The rail-connecting jig of claim 6, wherein the roller-pushing means comprises a roller-pushing piece and a clamp handle, the roller-pushing means being provided back of the second roller accommodated in the long groove.

8. The rail-connecting jig of claim 7, wherein the roller-pushing piece is formed of a disk which is smaller in diameter than an inner diameter of the through-hole, the roller-pushing piece having a roller groove in a front surface thereof, and a protrusion on a rear surface.

9. The rail-connecting jig of claim 8, wherein the clamp handle has a male-threaded portion, which is engaged with the through-hole with its front end face abutted against the protrusion of the roller-pushing piece.

10. The rail-connecting jig of claim 1, wherein the jig body has a grip fixedly mounted on an outer surface of the jig body which is perpendicular to the first and second wings of the jig body.

11. The rail-connecting jig of claim 10, wherein the grip includes a hole which is capable of confirming a connection of the guide rails.

12. The rail-connecting jig of claim 1, wherein the jig body has a plastic slide board fixedly mounted on an inner surface of the jig body which is perpendicular to the first and second wings.

13. The rail-connecting jig of claim 1, wherein the both ends of the second roller are supported through two spring steel wires on the second wing so that the second roller is movable back and forth.

* * * * *